United States Patent Office 3,046,258
Patented July 24, 1962

3,046,258
DIALLYL ALKYL ESTERS OF BENZENEPOLY-CARBOXYLIC ACIDS
William Hodes, Stamford, Conn., and Richard E. Van Strien, Griffith, Ind., assignors to Standard Oil Company, Chicago, Ill., a corporation of Indiana
No Drawing. Filed Apr. 24, 1959, Ser. No. 808,560
3 Claims. (Cl. 260—78.5)

This invention relates to a new composition of matter derived from a benzenepolycarboxylic acid containing at least 3 carboxyl groups wherein 2 carboxyl groups are reacted with allyl alcohol and the remaining carboxyl group(s) is reacted with an alkanol. Also, the invention relates to resins prepared from, or utilizing, the new composition of matter.

An object of the invention is a diallyl alkyl ester of benzenepolycarboxylic acids containing at least 3 carboxyl groups. Another object is a resin prepared by polymerization of diallyl alkyl esters of benzenepolycarboxylic acids containing at least 3 carboxyl groups. A further object is a resin prepared by copolymerizing a monomer with diallyl alkyl ester of benzenepolycarboxylic acid containing at least 3 carboxyl groups. A preferred object of the invention is a diallyl alkyl ester derived from trimellitic anhydride. Other objects will become apparent in the course of the detailed description of the invention.

The new composition of matter of the invention is of the formula

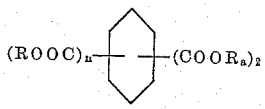

where $R_a$ is allyl, R is alkyl containing from 1 to 13 carbon atoms and $n$ is an integer equal to at least 1.

The composition of the invention is derived from a benzenepolycarboxylic acid containing at least 3 carboxyl groups. Examples of these acids are trimellitic acid, trimellitic anhydride, trimesic acid, hemimellitic acid, hemimellitic anhydride, pyromellitic acid, pyromellitic dianhydride, benzenepentacarboxylic acid and mellitic acid. The preferred acids are trimellitic anhydride and pyromellitic dianhydride.

The composition of the invention contains two ester groupings obtained by the reaction of the carboxyl groups with allyl alcohol.

The remaining carboxyl group (groups) is esterified by an alkanol containing from 1 to 13 carbon atoms. Examples of suitable alkanols are methanol, ethanol, n-butanol, t-butanol, 2-ethylhexanol and tridecanol. In addition to these individual compounds, particularly suitable alkanols are the mixture of isomeric alcohols obtained by the Oxo Process. The 8, 9, 10 and 13 carbon atom containing oxo alcohols are available commercially and are usually sold under the designation of, respectively, isooctyl, nonyl, decyl and tridecyl alcohols. The particular alkanol used will be dependent upon the properties desired in the particular compound. Illustrative examples of particular compounds are methyl diallyl trimellitate, isooctyl diallyl trimellitate, tridecyl diallyl trimellitate, isooctyl trimesate, dimethyl diallyl pyromellitate, dinonyl diallyl pyromellitate and tetramethyl diallyl mellitate.

The defined compounds are readily converted to thermoset resins by maintaining the compound or mixtures thereof at a temperature between about 100° C. and 150° C. for a suitable time to produce the resin. The polymerization is carried out in the presence of a peroxy-type catalyst, for example, benzoyl peroxide. The thermoset resins produced by this homopolymerization are clear solids—which may or may not possess a yellow color.

The composition of the invention may also be used in copolymerization reaction with monomers; it is thought that the composition functions as a cross-linking agent when used in small amounts, such as 1–10 weight percent. In larger amounts the copolymeric resins are changed to hard, dense, highly cross-linked materials. Examples of monomers which are particularly useful as the major component in copolymerization reaction are vinyl acetate, styrene, methylstyrene, dimethylstyrene, acrylonitrile and methyl methacrylate.

The copolymer resins are readily prepared by contacting the monomer and the composition of the invention at a temperature between about 70° C.–150° C. in the presence of a peroxy-type polymerization catalyst.

Preferably the copolymerization reaction is carried out in solution in a lower boiling benzene hydrocarbons such as benzene toluene, xylene, cumene and butyl benzene. The copolymers are dense solids of high crystallinity. The copolymers of styrene and the compositions of the invention are characterized by density in excess of 1.

EXAMPLES

Methyl diallyl trimellitate was prepared by introducing 0.05 mole of trimellitic anhydride and 0.2 mole of absolute methanol into a flask provided with a reflux condenser and a stirrer. For 30 minutes the contents of the flask were maintained at reflux conditions. At the end of this time the excess methanol was evaporated off at 30° C., with the help of a vacuum. Crystals of 1-monomethyl trimellitate and 2-monomethyl trimellitate were recovered from the flask; these were thoroughly dried at 60° C. at 1 mm. of Hg pressure.

11 g. of the mixture of monomethyl trimellitate and 8.9 ml. of allyl alcohol were introduced into a flask provided with a reflux condenser. The mole ratio of allyl alcohol to the methyl ester was 2.5. Diallyl ether in an amount of 5 ml. was added to the flask as a water removal agent. 2 drops of methanesulfonic acid was added as a catalyst; 0.01 g. of hydroquinone was added as a polymerization inhibitor. The mixture in the flask was brought to reflux temperature under a nitrogen atmosphere and maintained under these conditions until the theoretical amount of water had been removed overhead; the total time for this removal was 4 hours. The excess allyl alcohol and remaining diallyl ether were removed from the flask by distillation at 100 mm. of Hg pressure. The product mixture remaining in the flask was washed with dilute aqueous sodium hydroxide and then with water. The product mixture was dissolved in ether, was dried and then fractionated to recover a fraction boiling at 166–169° C. at 0.6 mm. of Hg pressure. This product fraction of methyl diallyl trimellitate was a clear, colorless liquid with an $n_D$ of 1.5222.

Polymerization

One gram of the methyl diallyl trimellitate was polymerized in the presence of 1% benzoyl peroxide at 120°–130° for 24 hours to form a clear, yellow thermoset resin.

Copolymerization

Styrene was copolymerized with 3% methyl diallyl trimellitate and 0.5% benzoyl peroxide at 80° C. in $C_6H_6$, to form a clear colorless polystyrene of high density (1.08) but low M. Wt. $(n)=0.2$. This is indicative of a minimal realignment of polymer molecules by slight cross-linking.

These alkyl diallyl esters of polycarboxylic acids are also useful monomers for copolymerization as a means of incorporating the properties of increased compatibility, adhesion, dyeing and plasticization with the confirmed ability of allylic monomers to cross-link and cure.

Thus having described the invention what is claimed is:

1. A copolymeric resin prepared by copolymerizing styrene, as the predominant reactant, and a hereinafter defined compound, in solution in a lower boiling benzene hydrocarbon, at a temperature between about 70° C. and 150° C., in the presence of a peroxy-type polymerization catalyst, and recovering a solid resin, wherein said compound is of the formula

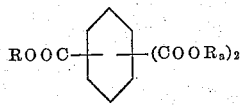

where R is an alkyl group containing from 1 to 13 carbon atoms and $R_a$ is an allyl group.

2. The resin of claim 1 wherein said compound is methyl diallyl trimellitate.

3. The resin of claim 1 wherein in said compound said "COOR$_a$" groups and said "ROOC" group are positioned to provide a 1,2,4-triester.

References Cited in the file of this patent

UNITED STATES PATENTS

| | | |
|---|---|---|
| 2,062,917 | Lawson | Dec. 1, 1936 |
| 2,202,846 | Garvey | June 4, 1940 |
| 2,218,439 | Rothrock | Oct. 15, 1940 |
| 2,370,578 | Pollack et al. | Feb. 27, 1945 |
| 2,445,189 | Shokal | July 13, 1948 |
| 2,595,852 | Hooper et al. | May 6, 1952 |
| 2,756,219 | Van Der Plas et al. | July 24, 1956 |